(12) United States Patent
Thacker

(10) Patent No.: US 7,140,663 B1
(45) Date of Patent: Nov. 28, 2006

(54) POWER-OPERATED VEHICLE SUN VISOR

(76) Inventor: Darell D. Thacker, P.O. Box 1359, Meeker, CO (US) 81641

( * ) Notice: Subject to any disclaimer, the term of this patent is extended or adjusted under 35 U.S.C. 154(b) by 44 days.

(21) Appl. No.: 11/094,635

(22) Filed: Mar. 31, 2005

(51) Int. Cl.
*B60J 3/02* (2006.01)

(52) U.S. Cl. ............... 296/97.4; 296/97.8; 160/DIG. 3

(58) Field of Classification Search ............... 296/97.1, 296/97.4, 97.7, 97.8, 97.9, 97.11; 160/DIG. 2, 160/DIG. 3
See application file for complete search history.

(56) References Cited

U.S. PATENT DOCUMENTS

| | | | |
|---|---|---|---|
| 2,559,471 A | | 7/1951 | Schrock |
| 2,585,769 A | * | 2/1952 | Hamlin ...................... 296/97.4 |
| 4,929,014 A | | 5/1990 | Clark et al. |
| 4,979,775 A | * | 12/1990 | Klose ........................ 296/97.4 |
| 4,988,139 A | * | 1/1991 | Yamada ..................... 296/97.4 |
| 5,000,506 A | * | 3/1991 | Abu-Shumays et al. ... 296/97.4 |
| 5,201,563 A | | 4/1993 | Liao |
| 5,409,284 A | * | 4/1995 | Mahler ...................... 296/97.4 |
| 5,443,300 A | * | 8/1995 | Mohammed ................ 296/97.4 |
| 5,551,744 A | | 9/1996 | Liao |
| D382,754 S | | 8/1997 | Siegel et al. |
| 6,227,601 B1 | * | 5/2001 | LaFrance ................... 296/97.4 |
| 6,267,431 B1 | * | 7/2001 | Watkins ..................... 296/97.4 |
| 6,318,789 B1 | * | 11/2001 | Stuart ........................ 296/97.4 |
| 6,983,786 B1 | * | 1/2006 | Chen ......................... 296/97.8 |

\* cited by examiner

*Primary Examiner*—Jason Morrow

(57) ABSTRACT

A visor assembly includes first and second coextensive shades formed from opaque material for reflecting sunlight outwardly and away from the vehicle. The shades are sized and shaped to become nested subjacent to a windshield and partially intercalated within a selected portion of the vehicle frame surrounding the windshield. The shades are situated within a slot of the vehicle and each shade includes an inner edge portion that is juxtaposed side-by-side and formed from rubber. First and second pairs of guide tracks are intercalated within the vehicle slot and conjoined to a top surface of the shades. The first pair of guide tracks lays adjacent to the vehicle slot and the second pair of guide tracks lays adjacent to the longitudinal axis of the vehicle. A power mechanism selectively positions the shades between retracted and extended positions. The user can extend and retract one shade while another shade remains stationary.

18 Claims, 4 Drawing Sheets

POWER-OPERATED VEHICLE SUN VISOR

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to sun visors and, more particularly, to a power-operated vehicle sun visor.

2. Prior Art

Every person who owns a vehicle of some type is well aware of the consequences when they leave their vehicle parked in the sun. Ultra Violet (UV) radiation freely enters the car through the front windshield and the rear window causing the interior of the car to be considerable warmer than the ambient temperature outside. Since the heated air inside can not escape an enclosed vehicle, the heat is transferred to surfaces on the interior thereof, such as the dashboard and the steering wheel, in effect causing the car's interior to become like an oven. This heating effect is not only uncomfortable to a driver once they reenter the vehicle, but heat transfer can cause permanent and serious damage to the interior surfaces of the car including, but not limited to, cracking and discoloration of surfaces. To prevent this from happening, the use of manual sun visors has become a common practice.

Manually placed and adjusted sun visors for temporarily covering the windshield of an automotive vehicle are nearly ubiquitous, available in a plethora of shapes, sizes, and colors, providing ample testimony for the need to protect the dashboard of contemporary motor vehicles. Unfortunately, forgetfulness on the part of the motor vehicle operator often results in an overheated vehicle or, worse, a damaged dashboard, when the simple, manually placed sun visor is absent from its intended position.

Accordingly, a need remains for a power-operated vehicle sun visor in order to overcome the above noted shortcomings. The present invention satisfies such a need by providing a power-operated vehicle sun visor that is easy to use, has electric and motorized means of operation. Ti improve safety, such a sun visor only operates when the engine is turned off. Such a vehicle sun visor advantageously eliminates the clutter and hassle associated with storing and putting up the more conventional manual sun visors that have inundated the market. The power-operated vehicle sun visor allows for a quick and convenient way to cover both a vehicle's windshield and rear window in order to reduce interior heating of the vehicle and the damage associated therewith.

BRIEF SUMMARY OF THE INVENTION

In view of the foregoing background, it is therefore an object of the present invention to provide a power-operated vehicle sun visor. These and other objects, features, and advantages of the invention are provided by a power-operated visor assembly for shielding undesirable sunlight from penetrating into an interior of the vehicle.

The visor assembly includes first and second coextensive shades formed from opaque material for advantageously reflecting sunlight outwardly and away from the vehicle. Such first and second shades are sized and shaped in such a manner that the first and second shades become nested subjacent to a windshield and partially intercalated within a selected portion of the vehicle frame surrounding the windshield.

The first and second shades are situated within a slot of the vehicle frame such that an outer edge portion of each of the first and second shades becomes hidden and directed along a travel path defined by the vehicle slot. Each of the first and second shades has a centrally registered longitudinal axis extending substantially parallel to a longitudinal length of the vehicle in such a manner that the axes are equidistantly positioned inwardly of the vehicle frame.

The first and second shades further include medially registered inner edge portions extending substantially parallel to the longitudinal axis of the vehicle frame. Such inner edge portions are juxtaposed side-by-side and are formed from rubber material such that a continuous seal is created between top and bottom edge portions of the vehicle window when the first and second shades are biased to the extended positions.

First and second pairs of guide tracks are intercalated within the vehicle slot and securely conjoined to a top surface of the first and second shades respectively. Such a first pair of guide tracks is equidistantly spaced from one of the axes wherein one of the first and second pairs of guide tracks lays adjacent to the vehicle slot and another of the first and second pairs of guide tracks lays adjacent to the longitudinal axis of the vehicle respectively. The first and second guide tracks are preferably attached to a top surface of the first and second shades respectively, and extend parallel to a longitudinal length of the first and second guide tracks respectively. Each of the first and second guide tracks may have a corrugated top surface for being operably engageable with the sprockets as the sprockets rotate about a fulcrum axis registered with the first and second drive shafts respectively.

The present invention further includes a power mechanism for selectively positioning the first and second shades between retracted and extended positions defined along a horizontal roof portion of the vehicle frame and a sloped window portion of the vehicle frame. The user can conveniently extend and retract one of the first and second shades while another of the first and second shades remains stationary.

The power mechanism preferably includes first and second motors medially seated proximate to the horizontal portion of the vehicle frame and above the sloped window portion thereof wherein the first and second motors are nested within the vehicle slot. Such first and second motors are preferably medially situated and equidistantly offset from the longitudinal axis of the vehicle such that the controller can be easily coupled thereto.

First and second elongated and rectilinear drive shafts are operably engaged with the first and second motors respectively. Each of the first and second drive shafts has opposed end portions traversing a longitudinal length of one of the first and second pairs of tracks respectively. Such first and second drive shafts span across approximately one-half a horizontal width of the vehicle window respectively. The first and second drive shafts are further preferably axially registered along a rectilinear path situated orthogonal to the travel path of the first and second shades respectively.

A plurality of annular sprockets is included that have serrated outer surfaces radially spaced about the opposed end portions of the first and second drive shafts respectively. A controller is housed within a compartment of the vehicle such that a user seated within the vehicle can conveniently readily access the controller during operating conditions. Such a controller is electrically coupled to a power supply source and to the first and second motors. The controller instructs the first and second motors to rotate in clockwise and counterclockwise directions for operably transferring the first and second pair of guide tracks through the vehicle slot.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
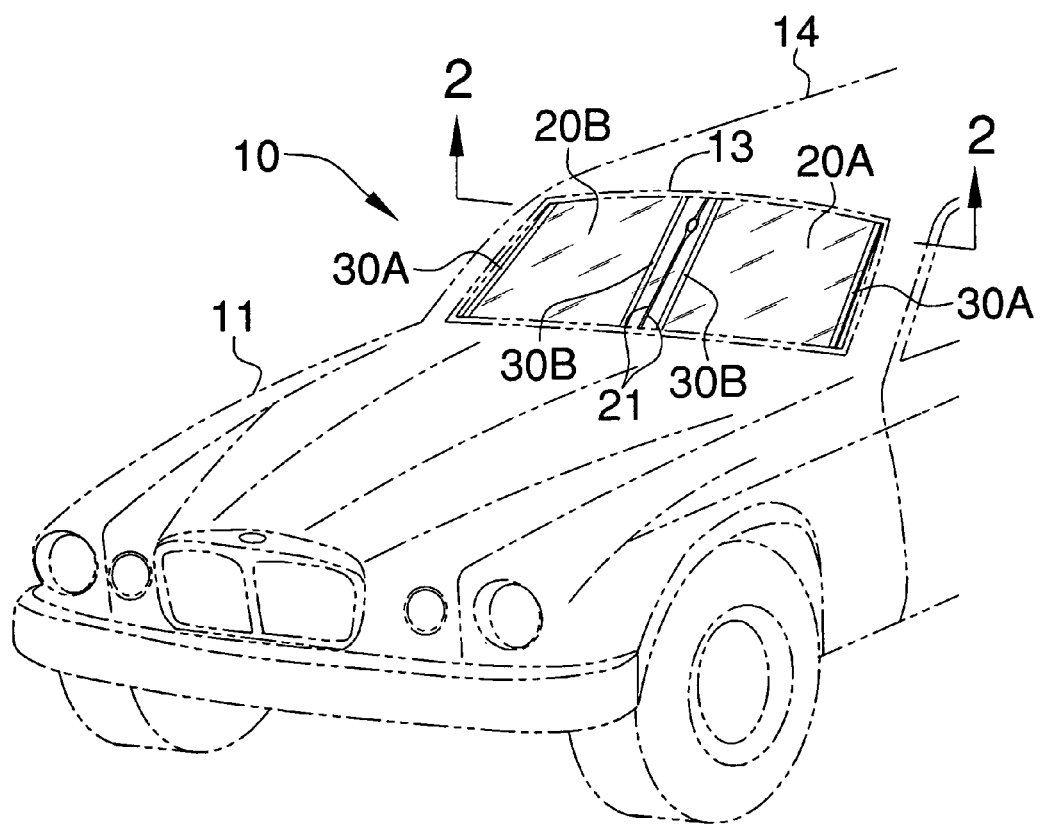
FIG. 1 is a perspective view showing a power-operated vehicle sun visor in a preferred environment, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–5 by the reference numeral 10 and is intended to provide a power-operated vehicle sun visor. It should be understood that the assembly 10 may be used to provide protection in many different types of vehicles and should not be limited in use to only passenger vehicles.

Referring initially to FIG. 1, the assembly 10 includes first 20A and second 20B coextensive shades 20 formed from opaque material for advantageously reflecting sunlight outwardly and away from the vehicle 11, and thus effectively and advantageously reducing the extent to which the interior temperature of the vehicle 11 is raised. Of course, the shades 20 may be produced from other suitable materials for reflecting sunlight, as is obvious to a person of ordinary skill in the art. Such first 20A and second 20B shades are sized and shaped in such a manner that the first 20A and second 20B shades become nested subjacent to a windshield 12 and partially intercalated within a selected portion of the vehicle frame 13 surrounding the windshield 12. Advantageously, the shades 20 may be produced in a variety of different shapes and sizes so as to fit the windshield 12 of any vehicle 11.

Figure 2:
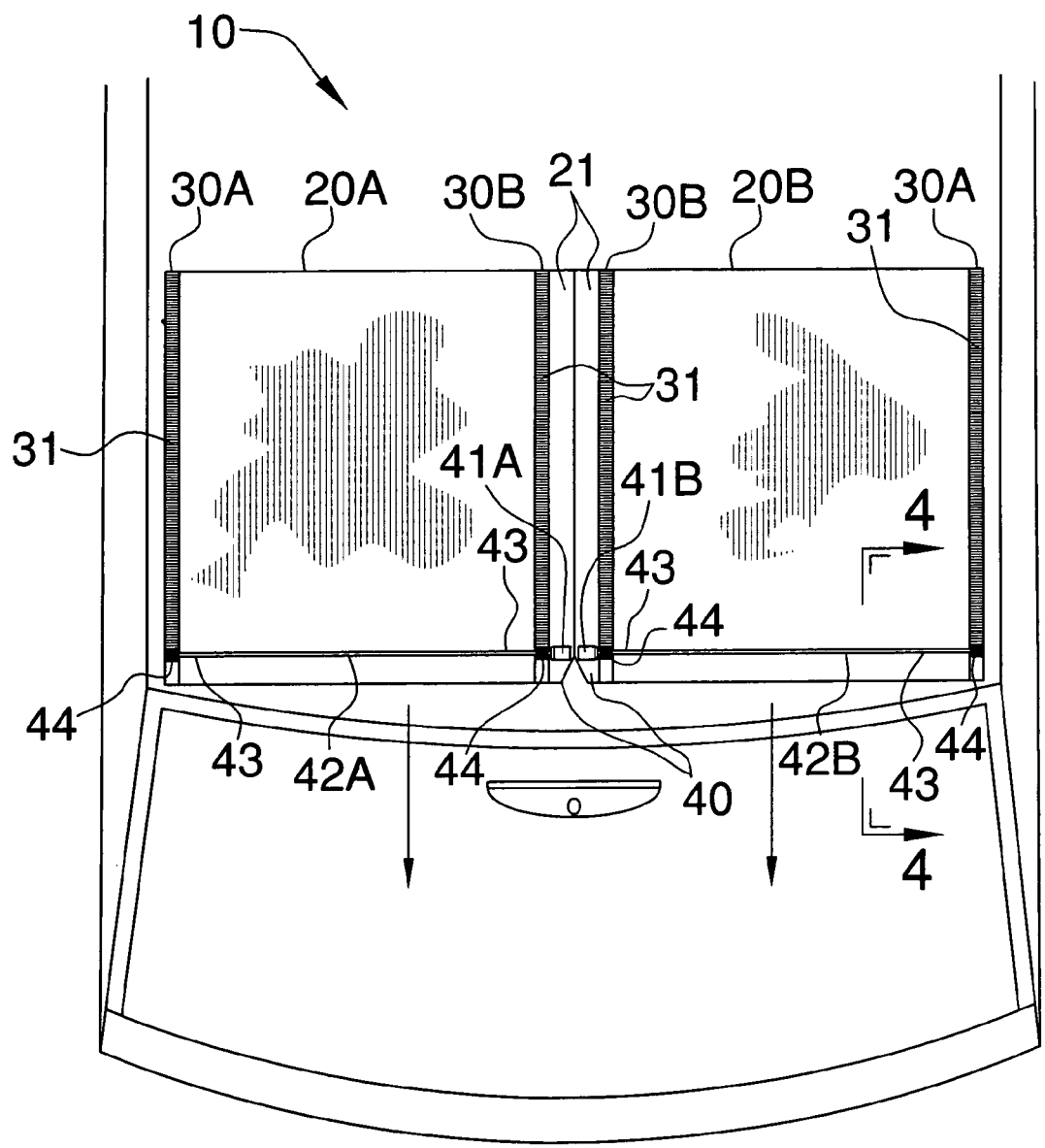
FIG. 2 is a cross-sectional view of the assembly shown in FIG. 1, taken along line 2—2.
Figure 4:
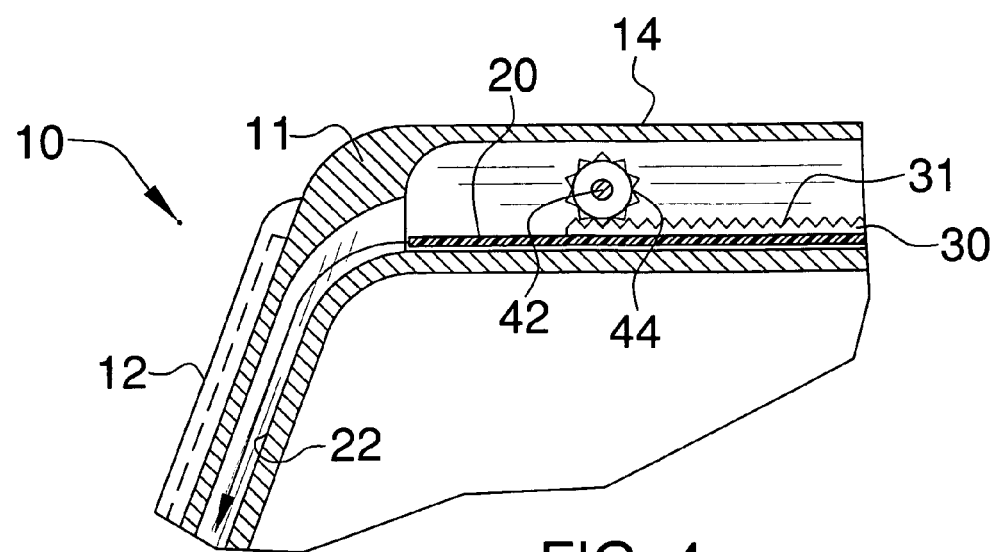
FIG. 4 is a cross-sectional view of the assembly shown in FIG. 3, taken along line 4—4.
Figure 5:
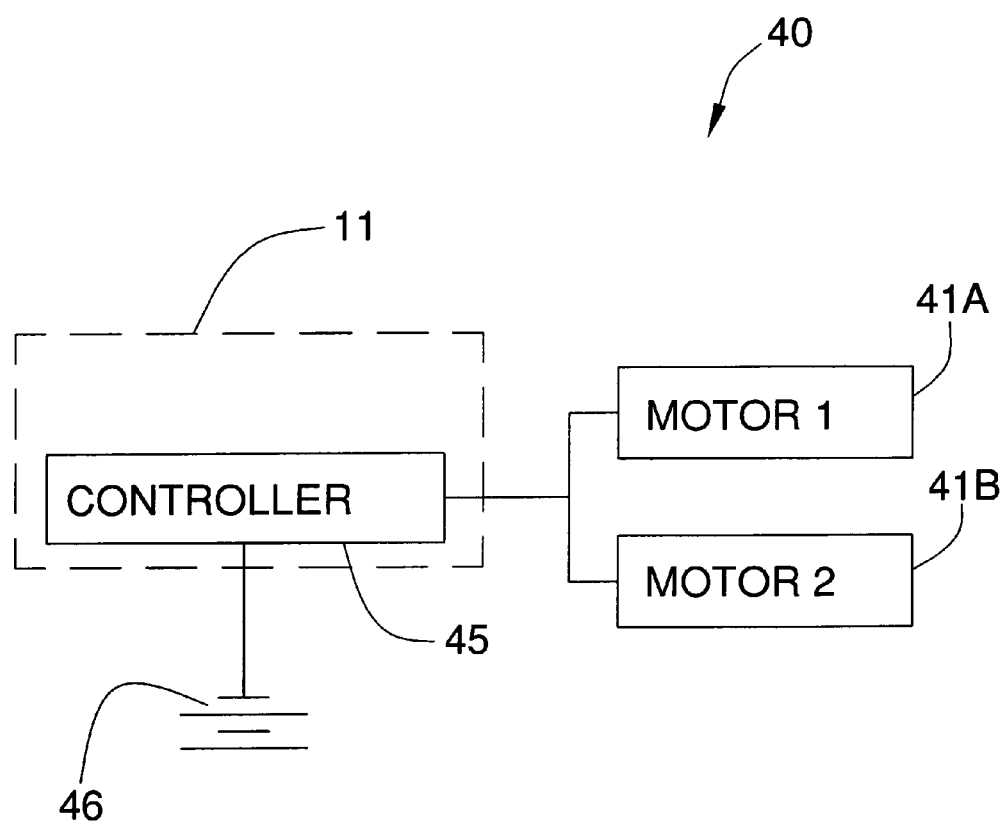
FIG. 5 is a schematic block diagram of the power mechanism shown in FIGS. 2 and 3.

Referring to FIGS. 2 and 4, the first 20A and second 20B shades are situated within a slot 22 of the vehicle frame 13 such that an outer edge portion of each of the first 20A and second 20B shades become hidden and directed along a travel path defined by the vehicle slot 22. This feature is essential for eliminating the gap, associated with conventional sun visors, between the vehicle frame 13 and the sun visor 10, thus resulting in more effective reflection of sunlight. Each of the first 20A and second 20B shades has a centrally registered longitudinal axis extending substantially parallel to a longitudinal length of the vehicle 11 in such a manner that the axes are equidistantly positioned inwardly of the vehicle frame 13.

Figure 3:
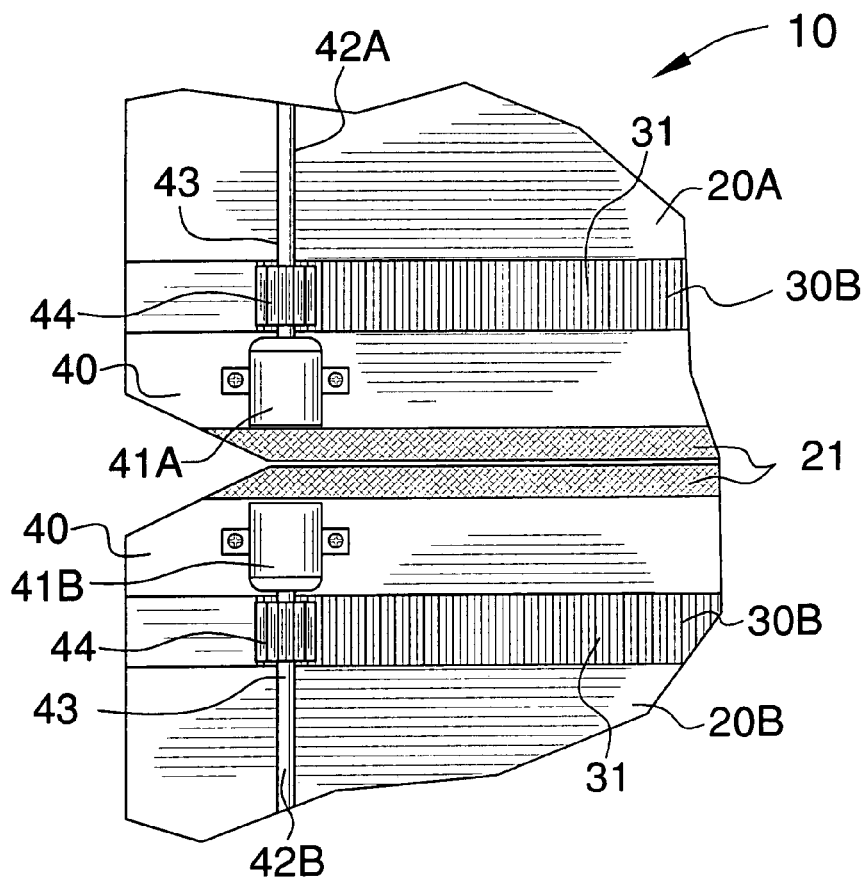
FIG. 3 is an enlarged view of the power mechanism shown in FIG. 2.

Referring to FIGS. 1 through 3, the first 20A and second 20B shades further include medially registered inner edge portions 21 extending substantially parallel to the longitudinal axis of the vehicle frame 13. Such inner edge portions 21 are juxtaposed side-by-side and are formed from rubber material such that a continuous seal is created between top and bottom edge portions of the vehicle window 12 when the first 20A and second 20B shades are biased to the extended positions.

Referring to FIGS. 2 through 4, first 30A and second 30B pairs of guide tracks 30 are intercalated within the vehicle slot 22 and securely conjoined to a top surface of the first 20A and second 20B shades respectively. Such a first pair of guide tracks 30A are equidistantly spaced from one of the axes wherein the first pair of guide tracks 30A lays adjacent to the vehicle slot 22 and the second pair of guide tracks 30B lays adjacent to the longitudinal axis of the vehicle 11 respectively. The first 30A and second 30B guide tracks are attached to a top surface of the first 20A and second 20B shades respectively and extend parallel to a longitudinal length of the first 30A and second 30B guide tracks respectively. Each of the first 30A and second 30B guide tracks have a corrugated top surface 31 that is crucial for allowing same to be operably engageable with the sprockets 44 (described herein below) as the sprockets 44 rotate about a fulcrum axis registered with the first 42A and second 42B drive shafts (described herein below) respectively.

Again referring to FIGS. 2 through 4, the present invention further includes a power mechanism 40 for selectively positioning the first 20A and second 20B shades between retracted and extended positions defined along a horizontal roof portion 14 of the vehicle frame 13 and a sloped window portion 12 of the vehicle frame 13. The user can conveniently extend and retract one of the first 20A and second 20B shades while another of the first and second shades remains stationary.

Referring to FIGS. 2 through 5, the power mechanism 40 includes first 41A and second 41B motors medially seated proximate to the horizontal portion of the vehicle frame 13 and above the sloped window portion 12 thereof wherein the first 41A and second 41B motors are nested within the vehicle slot 22. The motors 41 conveniently allow the assembly 10 to be automated, thus requiring little time and energy from the user to extend and retract the shades 20. Such first 41A and second 41B motors are medially situated and equidistantly offset from the longitudinal axis of the vehicle 11 such that the controller 45 (described herein below) can be easily coupled thereto.

Referring to FIGS. 2 through 4, first 42A and second 42B elongated and rectilinear drive shafts 42 are operably engaged with the first 41A and second 41B motors respectively. Each of the first 42A and second 42B drive shafts has opposed end portions 43 traversing a longitudinal length of one of the first 30A and second 30B pairs of tracks respectively. It is important for the drive shafts 42 to extend along the entire length of their respective shade 20 to ensure that the shades 20 are extended and retracted evenly during operating conditions, and thus advantageously do not become stuck. Such first 42A and second 42B drive shafts span across approximately one-half of a horizontal width of the vehicle window 12 respectively. The first 42A and second 42B drive shafts are further axially registered along a rectilinear path situated orthogonal to the travel path of the first 20A and second 20B shades respectively.

Referring to FIGS. 2 through 5, a plurality of annular sprockets 44 are included that have serrated outer surfaces radially spaced about the opposed end portions 43 of the first 42A and second 42B drive shafts respectively. A controller 45 is housed within a compartment of the vehicle 11 such that a user seated within the vehicle 11 can conveniently readily access the controller 45 during operating conditions. Such a controller 45 is electrically coupled to a power supply source 46 and to the first 41A and second 41B motors. The controller 45 instructs the first 41A and second 41B motors to rotate in clockwise and counterclockwise directions for operably transferring the first 30A and second 30B pair of guide tracks through the vehicle slot 22. Advantageously, the motors 41 and the controller 45 are only functional once the vehicle's 11 engine has been turned off, thus ensuring that the shades 20 are not deployed as a person is operating the vehicle 11.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A power-operated visor assembly for shielding undesirable sunlight from penetrating into an interior of the vehicle, said visor assembly comprising:

first and second coextensive shades formed from opaque material for reflecting sunlight outwardly and away from the vehicle, said first and second shades being sized and shaped in such a manner that said first and second shades become nested subjacent a windshield and partially intercalated within a selected portion of the vehicle frame surrounding the windshield, said first and second shades being situated within a slot of the vehicle frame such that an outer edge portion of each said first and second shades become hidden and directed along a travel path defined by the vehicle slot, each said first and second shades having a centrally registered longitudinal axis extending substantially parallel to a longitudinal length of the vehicle in such a manner that the axes are equidistantly positioned inwardly of the vehicle frame;

first and second pairs of guide tracks intercalated within the vehicle slot and securely conjoined to a top surface of said first and second shades respectively, said first pair of guide tracks being equidistantly spaced from one of the axes wherein one said first and second pairs of guide tracks lays adjacent the vehicle slot and another said first and second pairs of guide tracks lays adjacent the longitudinal axis of the vehicle respectively; and power means for selectively positioning said first and second shades between retracted and extended positions defined along a horizontal roof portion of the vehicle frame and a sloped window portion of the vehicle frame.

2. The visor assembly of claim 1, wherein said power means comprises:

first and second motors medially seated proximate the horizontal portion of the vehicle frame and above the sloped window portion thereof wherein said first and second motors are nested within the vehicle slot;

first and second elongated and rectilinear drive shafts operably engaged with said first and second motors respectively, each said first and second drive shafts having opposed end portions traversing a longitudinal length of one said first and second pairs of tracks respectively, said first and second drive shafts spanning across approximately one-half a horizontal width of the vehicle window respectively;

a plurality of annular sprockets having serrated outer surfaces radially spaced about said opposed end portions of said first and second drive shafts respectively; and a controller housed within a compartment of the vehicle such that a user seated within the vehicle can readily access said controller during operating conditions, said controller being electrically coupled to a power supply source and said first and second motors;

wherein said controller instructs said first and second motors to rotate in clockwise and counterclockwise directions for operably transferring said first and second pair of guide tracks through the vehicle slot.

3. The visor assembly of claim 1, wherein said first and second guide tracks are attached to a top surface of said first and second shades respectively and extend parallel to a longitudinal length of said first and second guide tracks respectively.

4. The visor assembly of claim 2, wherein said first and second drive shafts are axially registered along a rectilinear path situated orthogonal to the travel path of said first and second shades respectively.

5. The visor assembly of claim 2, wherein each said first and second guide tracks have a corrugated top surface operably engageable with said sprockets as said sprockets rotate about a fulcrum axis registered with said first and second drive shafts respectively.

6. The visor assembly of claim 2, wherein said first and second motors are medially situated and equidistantly offset from the longitudinal axis of the vehicle such that said controller can be easily coupled thereto.

7. A power-operated visor assembly for shielding undesirable sunlight from penetrating into an interior of the vehicle, said visor assembly comprising:
   first and second coextensive shades formed from opaque material for reflecting sunlight outwardly and away from the vehicle, said first and second shades being sized and shaped in such a manner that said first and second shades become nested subjacent a windshield and partially intercalated within a selected portion of the vehicle frame surrounding the windshield, said first and second shades being situated within a slot of the vehicle frame such that an outer edge portion of each said first and second shades become hidden and directed along a travel path defined by the vehicle slot, each said first and second shades having a centrally registered longitudinal axis extending substantially parallel to a longitudinal length of the vehicle in such a manner that the axes are equidistantly positioned inwardly of the vehicle frame;
   wherein said first and second shades further include medially registered inner edge portions extending substantially parallel to the longitudinal axis of the vehicle frame, said inner edge portions being juxtaposed side-by-side and being formed from rubber material such that a continuous seal is created between top and bottom edge portions of the vehicle window when said first and second shades are biased to the extended positions;
   first and second pairs of guide tracks intercalated within the vehicle slot and securely conjoined to a top surface of said first and second shades respectively, said first pair of guide tracks being equidistantly spaced from one of the axes wherein one said first and second pairs of guide tracks lays adjacent the vehicle slot and another said first and second pairs of guide tracks lays adjacent the longitudinal axis of the vehicle respectively; and
   power means for selectively positioning said first and second shades between retracted and extended positions defined along a horizontal roof portion of the vehicle frame and a sloped window portion of the vehicle frame.

8. The visor assembly of claim 7, wherein said power means comprises:
   first and second motors medially seated proximate the horizontal portion of the vehicle frame and above the sloped window portion thereof wherein said first and second motors are nested within the vehicle slot;
   first and second elongated and rectilinear drive shafts operably engaged with said first and second motors respectively, each said first and second drive shafts having opposed end portions traversing a longitudinal length of one said first and second pairs of tracks respectively, said first and second drive shafts spanning across approximately one-half a horizontal width of the vehicle window respectively;
   a plurality of annular sprockets having serrated outer surfaces radially spaced about said opposed end portions of said first and second drive shafts respectively; and
   a controller housed within a compartment of the vehicle such that a user seated within the vehicle can readily access said controller during operating conditions, said controller being electrically coupled to a power supply source and said first and second motors;
   wherein said controller instructs said first and second motors to rotate in clockwise and counterclockwise directions for operably transferring said first and second pair of guide tracks through the vehicle slot.

9. The visor assembly of claim 7, wherein said first and second guide tracks are attached to a top surface of said first and second shades respectively and extend parallel to a longitudinal length of said first and second guide tracks respectively.

10. The visor assembly of claim 8, wherein said first and second drive shafts are axially registered along a rectilinear path situated orthogonal to the travel path of said first and second shades respectively.

11. The visor assembly of claim 8, wherein each said first and second guide tracks have a corrugated top surface operably engageable with said sprockets as said sprockets rotate about a fulcrum axis registered with said first and second drive shafts respectively.

12. The visor assembly of claim 8, wherein said first and second motors are medially situated and equidistantly offset from the longitudinal axis of the vehicle such that said controller can be easily coupled thereto.

13. A power-operated visor assembly for shielding undesirable sunlight from penetrating into an interior of the vehicle, said visor assembly comprising:
   first and second coextensive shades formed from opaque material for reflecting sunlight outwardly and away from the vehicle, said first and second shades being sized and shaped in such a manner that said first and second shades become nested subjacent a windshield and partially intercalated within a selected portion of the vehicle frame surrounding the windshield, said first and second shades being situated within a slot of the vehicle frame such that an outer edge portion of each said first and second shades become hidden and directed along a travel path defined by the vehicle slot, each said first and second shades having a centrally registered longitudinal axis extending substantially parallel to a longitudinal length of the vehicle in such a manner that the axes are equidistantly positioned inwardly of the vehicle frame;
   wherein said first and second shades further include medially registered inner edge portions extending substantially parallel to the longitudinal axis of the vehicle frame, said inner edge portions being juxtaposed side-by-side and being formed from rubber material such that a continuous seal is created between top and bottom edge portions of the vehicle window when said first and second shades are biased to the extended positions;
   first and second pairs of guide tracks intercalated within the vehicle slot and securely conjoined to a top surface of said first and second shades respectively, said first pair of guide tracks being equidistantly spaced from one of the axes wherein one said first and second pairs of guide tracks lays adjacent the vehicle slot and another said first and second pairs of guide tracks lays adjacent the longitudinal axis of the vehicle respectively; and
   power means for selectively positioning said first and second shades between retracted and extended positions defined along a horizontal roof portion of the vehicle frame and a sloped window portion of the vehicle frame;

wherein the user can extend and retract one said first and second shades while another said first and second shades remains stationary.

14. The visor assembly of claim 13, wherein said power means comprises:
  first and second motors medially seated proximate the horizontal portion of the vehicle frame and above the sloped window portion thereof wherein said first and second motors are nested within the vehicle slot;
  first and second elongated and rectilinear drive shafts operably engaged with said first and second motors respectively, each said first and second drive shafts having opposed end portions traversing a longitudinal length of one said first and second pairs of tracks respectively, said first and second drive shafts spanning across approximately one-half a horizontal width of the vehicle window respectively;
  a plurality of annular sprockets having serrated outer surfaces radially spaced about said opposed end portions of said first and second drive shafts respectively; and
  a controller housed within a compartment of the vehicle such that a user seated within the vehicle can readily access said controller during operating conditions, said controller being electrically coupled to a power supply source and said first and second motors;
  wherein said controller instructs said first and second motors to rotate in clockwise and counterclockwise directions for operably transferring said first and second pair of guide tracks through the vehicle slot.

15. The visor assembly of claim 13, wherein said first and second guide tracks are attached to a top surface of said first and second shades respectively and extend parallel to a longitudinal length of said first and second guide tracks respectively.

16. The visor assembly of claim 14, wherein said first and second drive shafts are axially registered along a rectilinear path situated orthogonal to the travel path of said first and second shades respectively.

17. The visor assembly of claim 14, wherein each said first and second guide tracks have a corrugated top surface operably engageable with said sprockets as said sprockets rotate about a fulcrum axis registered with said first and second drive shafts respectively.

18. The visor assembly of claim 14, wherein said first and second motors are medially situated and equidistantly offset from the longitudinal axis of the vehicle such that said controller can be easily coupled thereto.

* * * * *